United States Patent
Youngs et al.

(10) Patent No.: US 6,522,886 B1
(45) Date of Patent: Feb. 18, 2003

(54) METHOD AND SYSTEM FOR SIMULTANEOUSLY SHARING WIRELESS COMMUNICATIONS AMONG MULTIPLE WIRELESS HANDSETS

(75) Inventors: Edward A. Youngs, Boulder, CO (US); Donald E. Gillespie, Boulder, CO (US); Jafar Nabkel, Boulder, CO (US); Harvey J. Benson, Highlands Ranch, CO (US); Karen Siegel-Jacobs, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/447,137

(22) Filed: Nov. 22, 1999

(51) Int. Cl.[7] .................................................. H04Q 7/20
(52) U.S. Cl. ...................... 455/450; 455/464; 455/519; 370/341; 370/345
(58) Field of Search .................................. 455/450, 416, 455/464, 509, 517, 518, 519; 370/263, 322, 329, 341, 342, 343, 345

(56) References Cited

U.S. PATENT DOCUMENTS

| | | | | |
|---|---|---|---|---|
| 5,724,648 A | * | 3/1998 | Shaughnessy et al. | 455/423 |
| 5,835,860 A | * | 11/1998 | Diachina | 455/458 |
| 6,005,848 A | * | 12/1999 | Grube et al. | 370/266 |
| 6,097,963 A | * | 8/2000 | Boltz et al. | 455/433 |
| 6,178,166 B1 | * | 1/2001 | Wilson et al. | 370/335 |
| 6,253,091 B1 | * | 6/2001 | Naddell et al. | 455/416 |
| 6,275,500 B1 | * | 8/2001 | Callaway et al. | 370/346 |
| 6,373,829 B1 | * | 4/2002 | Vilmur | 370/335 |
| 6,377,560 B1 | * | 4/2002 | Dailey | 370/329 |
| 6,385,461 B1 | * | 5/2002 | Raith | 455/466 |

* cited by examiner

Primary Examiner—Thanh Cong Le
Assistant Examiner—Andrew T Harry
(74) Attorney, Agent, or Firm—Townsend and Townsend and Crew, LLP

(57) ABSTRACT

A method and system for simultaneously sharing wireless communications among multiple wireless handsets deployed in a wireless network having at least one cell site associated therewith includes a first and second wireless handset for transmitting a request for the same wireless communication. The wireless network then assigns a first wireless receive channel to the first wireless handset and the second wireless handset and simultaneously transmits the requested wireless communication to the first and second wireless handsets for receipt by the first wireless receive channel. If the requested wireless communication originates from a source handset, and the first and second handsets are located in direct communication proximity to the source handset, the source handset itself negotiates the common wireless receive channel for receiving the requested wireless communication.

36 Claims, 3 Drawing Sheets

METHOD AND SYSTEM FOR SIMULTANEOUSLY SHARING WIRELESS COMMUNICATIONS AMONG MULTIPLE WIRELESS HANDSETS

CROSS-REFERENCE TO RELATED APPLICATION

This application relates to co-pending application entitled, "Method and System for Providing Transmission of Selected Media Programs to a Wireless Subscriber," having the same filing date as the present invention.

1. Technical Field

This invention relates to methods and systems for simultaneously sharing wireless communications among multiple wireless handsets.

2. Background Art

Today, wireless phone systems are designed to provide private, two-way voice conversations and data transmissions. This is accomplished by assigning each data or voice call to a separate, duplex channel. However, in some cases it may desirable to allow multiple handsets to simultaneously receive the same voice transmission or the same data transmission. This may be the case when providing "party-line" services, multi-party coordination services such as search coordination, conference calling services, multi-party games, or other similar services in which multiple parties transmit to, and receive from, more than one other party who have similar capabilities. It may also be desirable to simultaneously transmit from multiple wireless handsets to a single receiver or data collection point, such as providing simultaneous collection of voice, data, video or other reports from multiple parties that are capable of transmitting to one or more collection points. Still further, it may be desirable to simultaneously transmit information to multiple parties from a single source or point, such as in the case of emergency broadcasts of weather alerts, civil actions, natural disasters, etc.

By suitable reconfiguration of system and terminal capabilities and resources, these new service capabilities could be realized with significant spectrum economies over current practice through multiple, simultaneous use of the same radio channel.

Thus, there exists a need for allowing multiple wireless handsets to be able to simultaneously share the same wireless communications spectrum in receiving or transmitting common wireless communications.

SUMMARY OF THE INVENTION

It is a general object of the present invention to allow multiple wireless handsets to simultaneously transmit and receive wireless communications over a common wireless channel.

It is another object of the present invention to efficiently utilize the wireless communications spectrum when simultaneously sharing the communications among the multiple wireless handsets located in the same wireless cell site coverage area.

In carrying out the above objects and other objects, features, and advantages of the present invention, a method is provided for simultaneously sharing wireless communications among multiple wireless handsets deployed in a wireless network having at least one cell site coverage area associated therewith. The method includes receiving a request for the same wireless communication from a first and second wireless handset, assigning a first wireless receive channel to the first wireless handset and the second wireless handset, and simultaneously transmitting the requested wireless communication via the first wireless receive channel for receipt by the first and second wireless handsets.

In further carrying out the above objects and other objects, features, and advantage of the present invention, a system is also provided for carrying out the steps of the above described method. The system includes a first and second wireless handset each for transmitting a request for the same wireless communication. The system also includes a wireless network for assigning a first wireless receive channel to the first wireless handset and the second wireless handset and simultaneously transmitting the requested wireless communication via the first wireless receive channel for receipt by the first and second wireless handsets.

Still further, in carrying out the above objects and other objects, features, and advantages of the present invention, a method is provided for allowing simultaneous sharing of wireless communications among multiple wireless handsets when the wireless communications originates from a source handset. The method includes receiving a request at the source handset for the same wireless communication from a first and second wireless handset located within direct communication proximity to the source handset, assigning a first wireless receive channel to the first and second wireless handsets, and simultaneously transmitting the requested wireless communication via the first wireless receive channel for receipt by the first and second wireless handsets.

In carrying out the above objects and other objects, features, and advantages of the present invention, a system is also provided for carrying out the steps of the above described method. The system includes a first and second wireless handset each for transmitting a request for the same wireless communication while located within direct communication proximity to the source handset. Upon receiving the request, the source handset assigns a first wireless receive channel to the first and second wireless handsets and simultaneously transmits the requested wireless communication via the first wireless receive channel for receipt by the first and second wireless handsets.

In carrying out the simultaneous transmission feature of either embodiments of the present invention, each of the wireless handsets is further assigned the same wireless transmit channel so that each of the handsets may communicate with each other over the shared communication channel. Thus, multi-party communications among the wireless handsets is possible while receiving shared communications.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
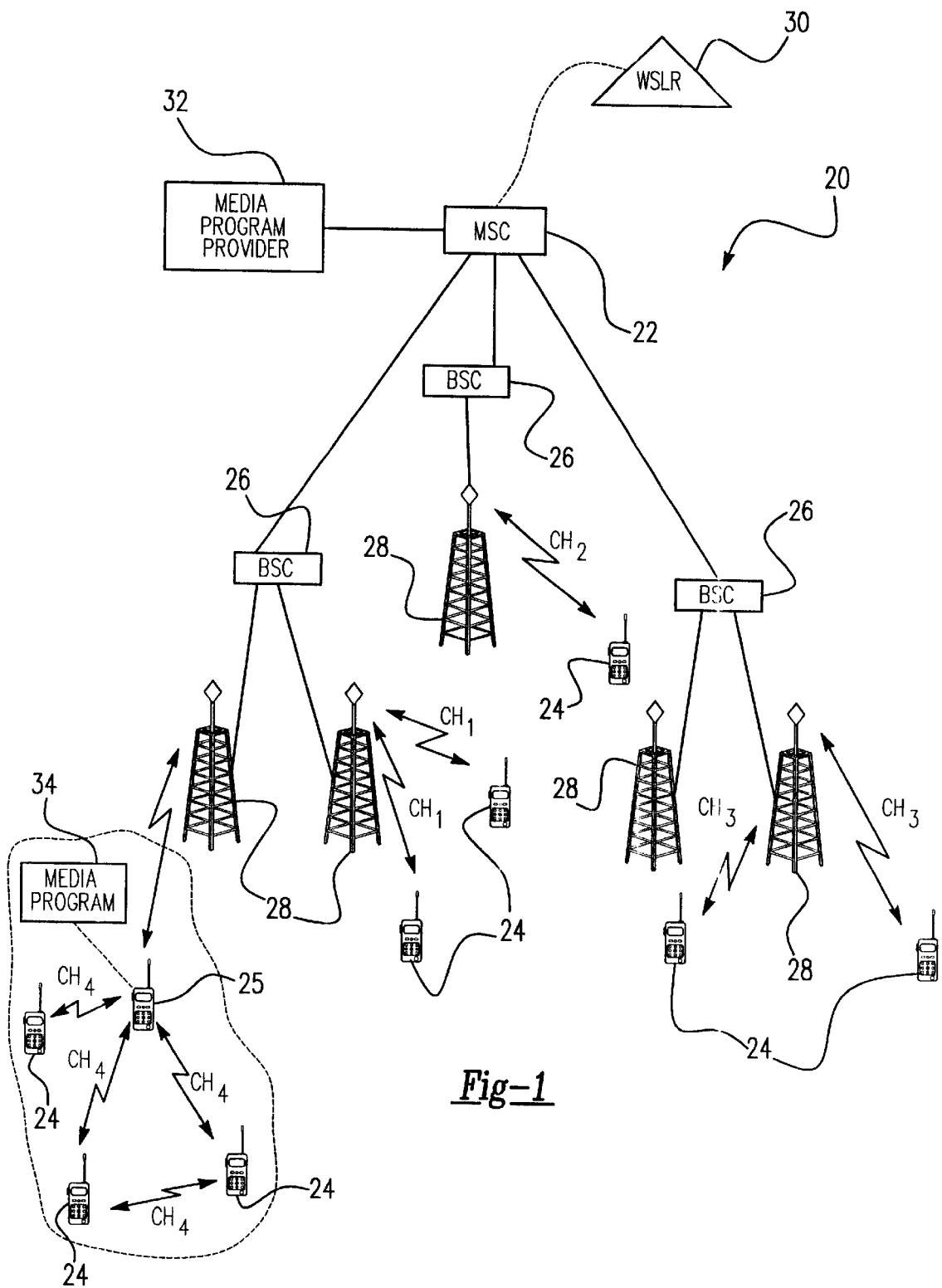
FIG. 1 is a schematic diagram of a wireless network system architecture incorporating the teachings of the present invention.

A schematic diagram of the system architecture of a wireless network incorporating the teachings of the present invention is shown in FIG. 1. The wireless network 20 typically includes a Mobile Switching Center (MSC) 22 for processing calls to and from the wireless users of the wireless network 20. MSC 22 is known to those skilled in the art as a digital telephone exchange that controls the switching between a wireline network and mobile cell sites for all wireline-to-mobile, mobile-to-wireline, and mobile-to-mobile calls. In operation, when MSC 22 receives a call from the wireline network that is directed to a wireless handset 24, MSC 22 deciphers the telephone number dialed by the originating caller and alerts Base Station Controllers (BSCs) 26 (described below) at one or more cell sites to page the corresponding wireless handset 24. Similarly, when wireless handset 24 places a call, MSC 22 accepts the dialing data from BSC 26 and uses the dialed number for routing the communication. MSC 22 also processes mobile registration status data received from BSC 26, switches calls to other cells, processes diagnostic information, and compiles mobile billing information.

Typical wireless networks include several coverage areas each including multiple adjoining cells. The BSC 26, which operates under the direction of MSC 22, serves each coverage area via a plurality of Base Stations (BSs) 28 disposed throughout each of the adjoining cells. The BSC 26 manages each of the radio channels assigned to its coverage area, supervises calls, turns the radio transceivers on and off, injects data onto control and user channels, and performs diagnostic tests on the cell site equipment.

To register a subscriber in the wireless network 20, MSC 22 ascertains whether a subscriber is present in the wireless network when the subscriber places a call via the wireless handset 24, receives a call via the wireless handset 24, or by automatic registration. Specifically, each time wireless handset 24 is powered on or a call is originated from wireless handset 24, certain information is transmitted to MSC 22, including a Mobile Identification Number (MIN), an Electronic Serial Number (ESN), and a System Identification (SID) of the wireless handset 24.

In order to respond to subscriber call requests, the MSC 22 compares the information transmitted by the wireless handset 24 with subscriber data contained in a database, referred to as a Wireless Subscriber Location Register 30. The WSLR 30 is a master database for storing data related to each mobile subscriber, such as the subscriber profile and mobility information together with their relevant permanent (static) data, such as access capabilities and subscriber services. WSLR 30 also contains location and service data for each visiting subscriber entering its coverage area in order to route incoming and outgoing calls appropriately. The WSLR 30 performs substantially the same functionality as the well known Home Location Register and Wireless Service Control Point, yet serves one or more MSCs 22 rather than only one MSC 22, as traditionally done in the prior art.

MSC 22 and WSLR 30 communicate with each other utilizing a signaling protocol, such as IS41 Mobile Application Part (MAP) or GSM MAP. In some implementations, MSC 22 and WSLR 30 may be integrated into one component.

Figure 2A:
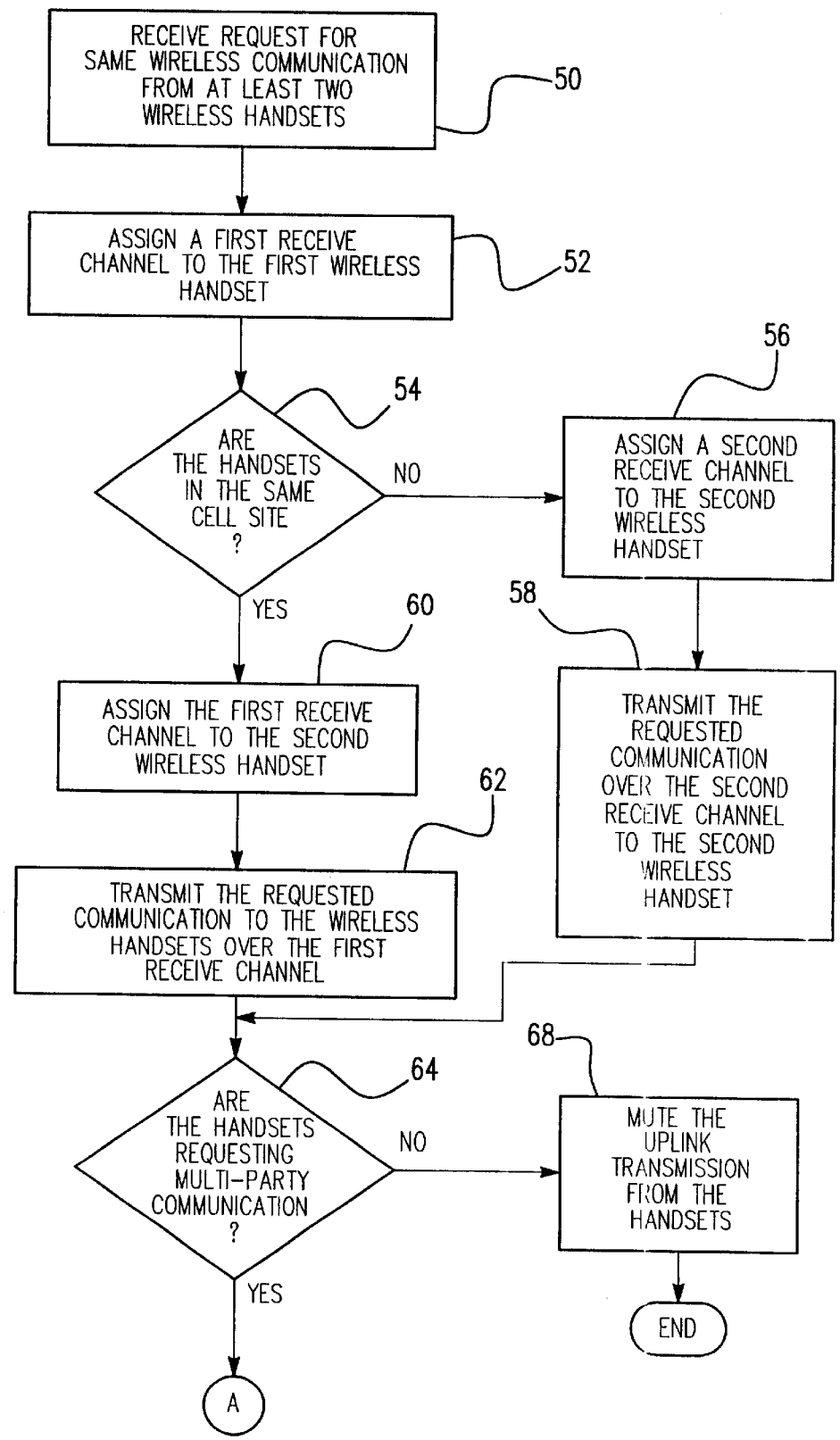
FIGS. 2a–2b are flow diagrams illustrating the general sequence of steps associated with the method of the present invention.
Figure 2B:
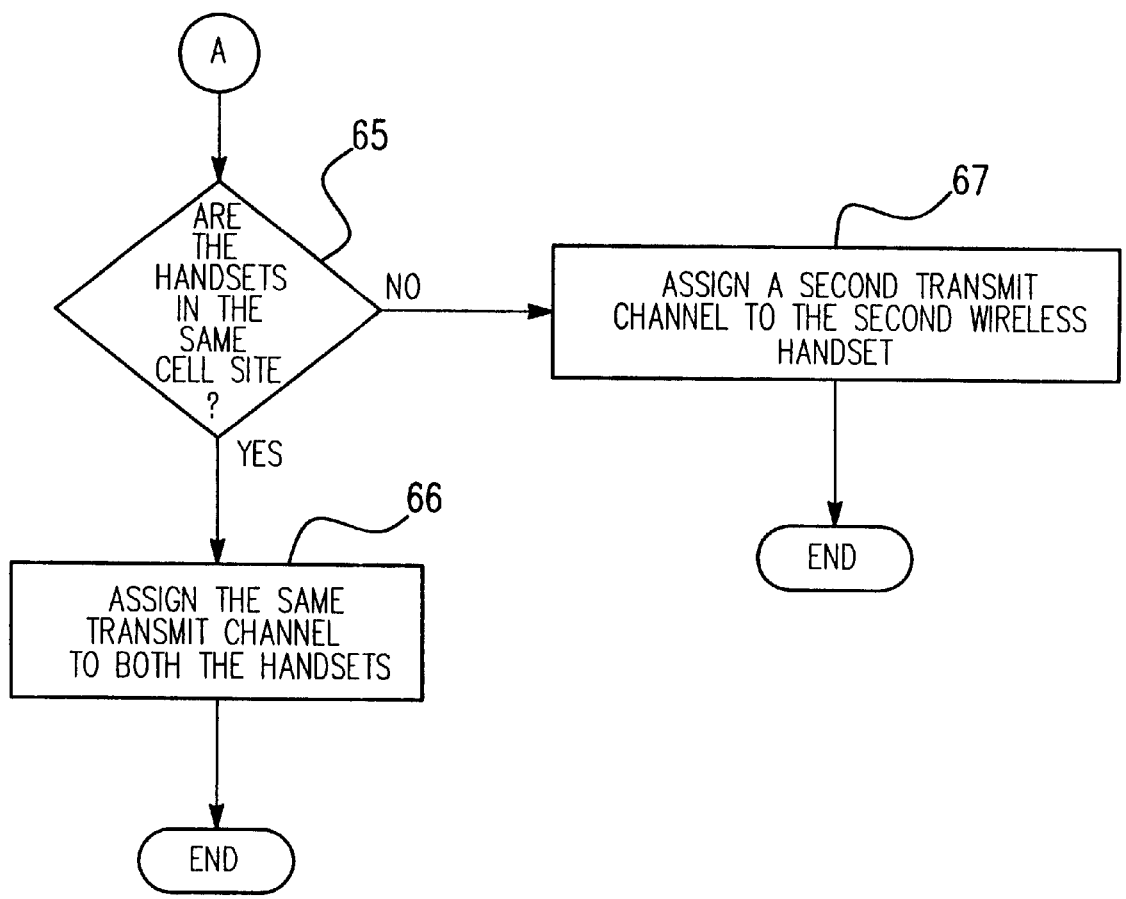

Turning now to FIG. 2, there is shown a flow diagram illustrating the general sequence of steps associated with the method of the present invention. First, the MSC 22 receives a request for the same wireless communication from at least two wireless handsets, as shown at block 50. The communication can be an audio, video, data, or any other similar communication. The communication can also be a pre-established media program, either pre-recorded or live, such as a television or radio broadcast, as shown at block 32 in FIG. 1. For example, video communications may include sports programming delivered via a traditional broadcast or television provider or via the Internet. Similarly, data communications may include media such as an Internet web page, stock quotes or sports scores.

Selection of these types of communications can be accomplished in one of several ways. The subscriber could enter a well-known number or letter designation for the desired program. For example, "7" or "43" for a TV-cable program, or "1650" or "630" for a radio program (FM/AM). Alternatively, if a unique mapping for programs in a particular area can be achieved, then the subscriber could enter "KBCO" or "KUSA" to designate the station's call letters. This approach assumes the user knows the numbers for desired programs or has reference to a printed Program Listing Guide or some equivalent.

Still further, the handset 24 could present the subscriber with a list of available programs on the handset display or with an auditory list. The subscriber would then simply select the desired program and the MSC 22 would execute the needed functions to request that program. The handset 24 would provide the needed "navigation" and "search" features for the subscriber to review the entire list, find specific programs, mark/save favorite programs, etc. via arrow and scroll buttons, or other navigation mechanisms known to those skilled in the art.

The "menu" of program options could be presented to the subscriber via the handset either by having the "menu" built into the handset 24 at the time of manufacture, or by dynamically creating the "menu" for the subscriber whenever the subscriber enters a "program request" mode. In this instance, the handset 24 and the MSC 22 would exchange commands that dynamically transmit the currently available program list for the area the user is in directly to the handset 24.

In yet another embodiment, the subscriber could use the handset 24 to dial a specific "phone" number that would either access a special directory that would prompt the subscriber with program options or the wireless system could designate a different phone number for each program. Finally, the subscriber could use the handset 24 to dial a special "code" number that corresponds to a particular channel, similar to the codes used in the TV-Guide VCR-programming approach.

Upon receiving the request for the wireless communication, the MSC 22 assigns a first wireless receive channel to the first wireless handset, as shown at block 52. A wireless connection between a BS 28 and a wireless handset 24 is enabled by the availability, configuration and control of at least two radio channels: a "bearer" channel over which subscriber information is sent over a transmit channel portion and received over a receive channel portion, and a shared "signaling" channel over which system information is exchanged between the BS 28 and the multiple handsets 24. The allocation of the radio spectrum into shared channels may be accomplished differently for the different industry-standard practices known to those skilled in the art. In Frequency Division Multiple Access (FDMA) systems, for example, a duplex (two-way) voice channel is accomplished by simultaneously allocating the same frequency bands for the receive portion of the voice channel of both the wireless handsets 24. In Time Division Multiple Access (TDMA) and Code Division Multiple Access (CDMA) systems, channels are defined via time slots and code channels, respectively. Again, the simultaneous transmission to the wireless handsets 24 is accomplished by allocating the same time slot or code channel for the receive portion of the bearer channel of both handsets 24.

If the wireless handsets are located in different cell sites, as shown at conditional block 54, the second wireless handset is assigned a second wireless receive channel for receiving the requested communication, as shown at block 56. It is possible that the second wireless receive channel is the same as the first wireless receive channel depending on the available resources in the second cell site. If the first wireless receive channel is not available, the second wireless receive channel is different from the first wireless receive channel and allocated utilizing conventional channel assignment techniques as described above. The wireless network 20 then sends the requested communication over the first and second wireless receive channels, as shown at block 58, to the first and second wireless handsets 24, respectively, via their respective BSs 28 so that each handset is simultaneously receiving the same communication.

If, however, the wireless handsets 24 are located in the same cell site, then the same first wireless receive channel is also assigned to the second handset, as shown at block 60, and the communication is transmitted simultaneously to the first and second wireless handsets 24 via the same first wireless receive channel, block 62. When transmitting to multiple handsets 24 within a service area of a single BS 28, BS 28 must transmit the communication at a power level sufficient to reach the farthest handset 24 within its service area. Once a handset 24 travels to another cell site and is handed off to that cell site, the BS 28 must adjust the transmit power level to reach the current handset farthest from the BS 28. Consequently, the handset 24 now must be flexible to receive signals that may be stronger than required by conventional handsets.

The present invention also accommodates the sharing of wireless communications in the form of multi-party conversations, such as "party lines" or "chat services," for wireless handsets 24. Within the service area of a single BS 28, if multi-party conversation is desired, as shown at conditional block 64, the wireless handsets 24 are allocated the same transmit channel, i.e., frequency, time slot, or code channel, for the transmission portion of the bearer channel, as shown at conditional block 65 and block 66. This can be initiated in any number of ways. For example, the handsets 24 could call a predetermined number, possibly followed by selecting a conversation to be party to, e.g., a particular chat topic. The handsets 24 that are party to a particular chat topic then share an uplink channel that is decoded as a single channel. Similarly, on the downlink, the handsets 24 are directed to the same receive channel. Thus, large search parties might be substantially helped by being able to keep one another informed over an "open" line without unduly taxing network capacity.

Of course, the present invention supports "party-line" or "chat services" across multiple cell site coverage area by bridging them together in the wireless network, as shown at block 67, by assigning a second transmit channel to the handsets in the other cell site coverage area. As with the second receive channel, the second transmit channel may or may not be the same as the first transmit channel depending on availability of network resources.

If, however, the handsets are not participating in a party line scenario, the uplink, or transmit portion, of the channel of the handset 24 is muted, as shown at block 68. For example, if the program is a sporting event, it may be desirable to prevent the bridged parties from talking over the transmission. This can be done by instructing the handset 24 to reduce the power on the uplink to a minimum. Alternatively, the BS 28/MSC 22 could be programmed to not receive the uplink transmission.

In some circumstances, data services could also be accommodated. Point-to-multipoint wireless facsimile, for example, could be provided at great system capacity savings. Similarly, wireless video transmissions to multiple mobile handsets could be accommodated economically.

Although the present invention has been described in which the wireless network is responsible for receiving the request for shared wireless communications and assigning receive channels accordingly to enable simultaneous transmission of the communication for receipt by the same receive channel, it is also possible for the wireless handsets themselves to be able to negotiate the sharing of the wireless spectrum without intervention by the wireless network. Present day systems allow a first wireless handset to connect with a second wireless handset directly and establish a private communication channel from available channels. However, these systems are limited to point-to-point communications. The present invention, on the other hand, allows two or more handsets that are in direct communication proximity to a source handset to communicate directly with that source handset to establish the shared communication channel.

In this embodiment, the wireless communication may be any number of communications, such as, but not limited to, a broadcast of a child's soccer game for receipt by family members or a broadcast of some media program, as shown at block 34 in FIG. 1. The source handset 25, which is capable of communicating with multiple handsets simultaneously over the same communication channel, then assigns, or directs, the first and second wireless handsets to a first wireless receive channel so that they can simultaneously receive the requested wireless communication at the same time over a restricted shared channel.

As in the previous embodiment, here the source handset 25 must transmit the requested wireless communication at a power level based on the location of the first and second wireless handset so that it is sure to be received by the farthest handset. Also, the handsets can request the desired wireless communication in the manner as described above. And, if the handsets in this embodiment wish to participate in a multi-party communication, a common restricted shared transmit channel is assigned to the handsets as in the previous embodiment.

If any one of the handsets move out of the direct communication range of the source handset or another handset in a different cell site coverage area desires the same communication, the wireless network becomes involved as described above and assigns appropriate transmit and receive channels so as to bridge the handset, or handsets, with the other handsets directly communicating with the source handset 25. Again, these transmit and receive channels may or may not be the same as the original transmit and receive channels, depending on the availability of channel resources.

While the best modes for carrying out the invention have been described in detail, those familiar with the art to which this invention relates will recognize various alternative designs and embodiments for practicing the invention. This includes various architectures for constructing the wireless network. In some situations, the functionality of the MSC may be combined with a wireline network switch. In others, the intelligence for routing wireless calls may be distributed to BSCs or other wireless network elements thereby eliminating the MSC as a discrete element. The teachings of this invention may be practiced with these and other embodiments as defined by the following claims.

What is claimed is:

1. A method for simultaneously sharing wireless communications among multiple wireless handsets deployed in a wireless network having at least one cell site coverage area associated therewith, the method comprising:
   receiving a request for the same wireless communication from a first and second wireless handset;
   assigning a first wireless receive channel to the first wireless handset and the second wireless handset; and
   simultaneously transmitting the requested wireless communication via the first wireless receive channel for receipt by the first and second wireless handset;
   wherein receiving the request includes receiving a command signal selecting one of a plurality of pre-established communication choices.

2. The method as recited in claim 1 wherein the command signal is a predetermined number entered by a subscriber of one of the first and second wireless handsets.

3. The method as recited in claim 1 wherein the command signal is a number key depression made by a subscriber of one of the first and second wireless handsets as prompted by the one of the first and second wireless handsets.

4. A system for simultaneously sharing wireless communications among multiple wireless handsets deployed in a wireless network having at least one cell site coverage area associated therewith, the system comprising:
   a first and second wireless handset each for transmitting a request for the same wireless communication; and
   the wireless network for assigning a first wireless receive channel to the first wireless handset and the second wireless handset and simultaneously transmitting the requested wireless communication via the first wireless receive channel for receipt by the first and second wireless handsets;
   wherein each of the first and second wireless handsets are further operative to transmit a command signal selecting one of a plurality of pre-established communication choices.

5. The system as recited in claim 4 wherein the command signal is a predetermined number entered by a subscriber of one of the first and second wireless handsets.

6. The system as recited in claim 4 wherein the command signal is a number key depression made by a subscriber of one of the first and second wireless handsets as prompted by the one of the first and second wireless handsets.

7. A method for simultaneously sharing wireless communications among multiple wireless handsets deployed in a wireless network having at least one cell site coverage area associated therewith, wherein the wireless communications originates from a source handset, the method comprising:
   receiving a request at the source handset for the same wireless communication from a first and second wireless handset located within direct communication proximity to the source handset;
   assigning a first wireless receive channel to the first and second wireless handsets in response to the request; and
   simultaneously transmitting the requested wireless communication via the first wireless channel for receipt by the first and second wireless handsets.

8. The method as recited in claim 7 wherein simultaneously transmitting the requested wireless communication further includes simultaneously transmitting the requested wireless communication at a power level based on the location of the first and second wireless handsets.

9. The method as recited in claim 8 further comprising receiving the simultaneously transmitted wireless communication at the first and second wireless handsets at varying levels of receive signal strength.

10. The method as recited in claim 7 wherein receiving the request includes receiving a command signal selecting one of a plurality of pre-established communication choices.

11. The method as recited in claim 10 wherein the command signal is a predetermined number entered by a subscriber of one of the first and second wireless handsets.

12. The method as recited in claim 10 wherein the command signal is a number key depression made by a subscriber of one of the first and second wireless handsets as prompted by the one of the first and second wireless handsets.

13. The method as recited in claim 7 wherein each of the first and second wireless handsets has wireless transmit channel for transmitting communications and the method further comprising dynamically muting the wireless transmit channels of each of the first and second wireless handsets so as to restrict conversation during the simultaneous transmission of the wireless communication.

14. The method as recited in claim 7 further comprising:
   receiving a request from the first and second wireless handsets to participate in a multi-party communication while assigned the first wireless receive channel; and
   assigning a first wireless transmit channel to the first and second wireless handsets so as to allow multi-party communication between the source handset and the first and second wireless handsets while simultaneously receiving the same wireless communication.

15. The method as recited in claim 7 wherein the source handset is located in a first cell site coverage area and the wherein the wireless network further includes a second cell cite coverage area, the method further comprising:
   receiving a request for the same wireless communication at the wireless network from a third wireless handset located in one of the first cell site coverage area outside direct communication proximity to the source handset and a second cell site coverage area different from the first cell site coverage area;
   assigning a second wireless receive channel to the third wireless handset; and
   simultaneously transmitting the requested wireless communication via the first wireless receive channel for receipt by the first and second wireless handsets and via the second wireless receive channel for receipt by the third wireless handset.

16. The method as recited in claim 15 wherein the first and second wireless receive channels are the same.

17. The method as recited in claim 15 wherein the first and second wireless receive channels are different.

18. The method as recited in claim 15 wherein the third wireless handset has a wireless transmit channel for transmitting communications, the method further comprising:
   receiving a request from a least one of the first, second and third wireless handsets to participate in a multi-party communication while assigned the first and second wireless receive channels, respectively; and
   assigning a first wireless transmit channel to the first and second wireless handsets and a second wireless transmit channel to the third wireless handset so as to allow multi-party communication between the first, second and third wireless handsets while simultaneously receiving the same wireless communication.

19. The method as recited in claim 18 wherein the first and second wireless transmit channels are the same.

20. The method a recited in claim 18 wherein the first and second wireless transmit channels are different.

21. The method as recited in claim 7 wherein the wireless communication includes at least one of an audio, video, and data communication.

22. A system for simultaneously sharing wireless communications among multiple wireless handsets deployed in a wireless network having at least one cell site coverage area associated therewith, wherein the wireless communications originates from a source handset, the system comprising:
a first and second wireless handset located within direct communication proximity to the source handset in a first cell site coverage area for transmitting a request for the same wireless communication; and
the source handset for assigning a first wireless receive channel to the first and second wireless handsets in response to the request and simultaneously transmitting the requested wireless communication via the first wireless receive channel for receipt by the first and second wireless handsets.

23. The system as recited in claim 22 wherein the source handset, in simultaneously transmitting the requested wireless communication, is further operative to simultaneously transmit the requested wireless communication at a power level based on the location of the first and second wireless handsets.

24. The system as recited in claim 23 wherein the first and second wireless handsets are further operative to receive the simultaneously transmitted wireless communication at varying levels of receive signal strength.

25. The system as recited in claim 22 wherein each of the first and second wireless handsets are further operative to transmit a command signal selecting one of a plurality of pre-established communication choices.

26. The system as recited in claim 25 wherein the command signal is a predetermined number entered by a subscriber of one of the first and second wireless handsets.

27. The system as recited in claim 25 wherein the command signal is a number key depression made by a subscriber of one of the first and second wireless handsets as prompted by the one of the first and second wireless handsets.

28. The system as recited in claim 22 wherein each of the first and second wireless handsets has a wireless transmit channel for transmitting communications and wherein the source handset is further operative to dynamically mute the wireless transmit channels of each of the first and second wireless handsets so as to restrict conversation during the simultaneous transmission of the wireless communication.

29. The system as recited in claim 22 wherein each of the first and second wireless handsets are further operative to transmit a request to participate in a multi-party communication while assigned the first wireless receive channel, and wherein the source handset is further operative to assign a first wireless transmit channel to the first and second wireless handsets so as to allow multi-party communication between the source handset and the first and second wireless handsets while they are simultaneously receiving the same wireless communication.

30. The system as recited in claim 22 wherein the source handset is located in a first cell site coverage area and wherein the wireless network further includes a second cell site coverage area, the method further comprising:
a third wireless handset located in one of the first cell site coverage area outside direct communication proximity to the source handset and a second cell site coverage area different from the first cell site coverage area for transmitting a request for the same wireless communication; and
the wireless network for receiving the request from the third wireless, assigning a second wireless receive channel to the third wireless handset, and simultaneously transmitting the requested wireless communication via the second wireless receive channel for receipt by the third wireless handset.

31. The system as recited in claim 30 wherein the first and second wireless receive channels are the same.

32. The system as recited in claim 30 wherein the first and second wireless receive channels are different.

33. The system as recited in claim 30 wherein the third wireless handset further includes a wireless transmit channel for transmitting communications, the system further comprising:
at least one of the first, second and third wireless handsets transmitting a request to participate in a multi-party communication while assigned the first and second wireless receive channels, respectively;
the source handset for assigning a first wireless transmit channel to the first and second wireless handsets; and
the wireless network for assigning a second wireless transmit channel to the third wireless handset so as to allow multi-party communication between the first, second and third wireless handsets while simultaneously receiving the same wireless communication.

34. The system as recited in claim 33 wherein the first and second wireless transmit channels are the same.

35. The system as recited in claim 33 wherein the first and second wireless transmit channels are different.

36. The system as recited in claim 22 wherein the wireless communication includes at least one of an audio, video, and data communication.

* * * * *